United States Patent [19]

Hirsch

[11] Patent Number: 4,592,136
[45] Date of Patent: Jun. 3, 1986

[54] FASTENER PRESENTATION DEVICE
[75] Inventor: Richard F. Hirsch, Arcadia, Calif.
[73] Assignee: USM Corporation, Farmington, Conn.
[21] Appl. No.: 701,924
[22] Filed: Feb. 14, 1985
[51] Int. Cl.$^4$ ............................ B23Q 7/10; B23Q 7/12
[52] U.S. Cl. ........................................ 29/809; 221/167
[58] Field of Search ................ 221/167; 29/809, 818; 72/391

[56] References Cited

U.S. PATENT DOCUMENTS

| | | | |
|---|---|---|---|
| 2,433,561 | 12/1947 | Angell | 221/167 |
| 2,832,458 | 4/1958 | Ferhuson et al. | 198/416 |
| 3,054,170 | 9/1962 | Benichasa | 221/167 |
| 3,276,625 | 10/1966 | Zizkal | 221/167 |
| 3,415,102 | 12/1968 | Elliott | 72/391 |
| 3,535,764 | 10/1970 | Hoffman | 29/809 |
| 3,633,791 | 1/1972 | Kelly | 221/167 |
| 3,658,207 | 4/1972 | Schultz | 221/167 |
| 4,205,547 | 6/1980 | Yamasaka | 72/391 |

Primary Examiner—Howard N. Goldberg
Assistant Examiner—Steven Nichols
Attorney, Agent, or Firm—Alan N. McCartney

[57] ABSTRACT

A device for automatically presenting fasteners in a predetermined disposition comprising a container for the fasteners which presents the fasteners to a rotary drum which raises the fasteners upwardly for deposit into a chute. The fasteners are fed down the chute to a ramp which positions individual fasteners in a predesired position in a feed barrel for receipt by a fastener tool. An escapement mechanism is positioned between the chute and the ramp so that a single fastener at one time falls down the ramp into the feed barrel.

13 Claims, 7 Drawing Figures

FASTENER PRESENTATION DEVICE

BACKGROUND OF THE INVENTION

1. Field of the Invention

A device for automatically presenting fasteners in a desired position for placement into a fastener application tool or machine.

2. Statement Of The Prior Art

In the use of fasteners, it is desirable to automatically present the fastener to the fastener application tool or machine in a predetermined disposition. For example, blind fasteners of a rivet-mandrel type are adapted to be secured to workpieces and comprise a hollow rivet with a flange at one end and a headed mandrel having a stem extending through the barrel of the rivet. Upon insertion of the barrel of the rivet into a workpiece opening, the mandrel stem is grasped by a setting tool and pulled so that the mandrel head upsets the rivet body against the unexposed surface of the workpiece. Examples of such tools are shown in U.S. Pat. Nos. 3,981,377 and 4,205,547.

There are a variety of different types of generally hand held tools, both manual and powered, that are used to set pull-type blind fasteners. For industrial production, it is desirable to use a power tool that may have an air or electrical power assist to pull the mandrel stem. This facilitates expediting the rivet setting operation. Such tools are normally manually loaded, that is, the mandrel stem is manually inserted into the nose portion of the rivet setting tools. This requires the tool operator to hold the tool with one hand and select the individual blind rivets, from a bulk source, for example, with the other hand and insert the mandrel stem into the nose of the setting tool. This presents a slow and cumbersome rivet handling problem during the rivet setting operation. This operation is illustrative of the necessity of automatically presenting a fastener in a predetermined disposition for placement into a fastener application tool or machine.

Thus, for example, in the use of blind rivet fasteners, it is desirable to provide a device for automatically presenting the mandrel stem in a position for insertion into the nose of the rivet setting tool which eliminates the necessity of the operator manually inserting the mandrel stem into the setting tool during each rivet setting operation. A device of this latter type is illustrated in U.S. Pat. No. 3,415,102.

Devices for feeding different types of fasteners are also shown in U.S. Pat. Nos. 2,832,458; 3,276,625; 3,494,014; 3,535,764 and 3,658,207.

BRIEF SUMMARY OF THE INVENTION

In the continuous use of fasteners that are applied by a tool or machine, (in for example, industrial applications) it is desirable to automatically present the fastener in the desired position to be easily presented to the tool or machine which applies the fastener to the workpiece.

In the use of blind rivets, for example, it is desirable to automatically present the rivet to the setting tool so that the tool operator can easily insert the mandrel stem into the nose of the tool. Further, it is also desirable to obtain the rivet from a bulk source and automatically orient individual rivets and place the mandrel stem in a position easily accessible for insertion into the tool.

It is an object of this invention to provide a device which will select individual fasteners such as rivets, for example, from a bulk source and present the mandrel stem end first to the nose portion of a rivet setting tool. Further, such a device contains a rivet feed barrel having a drive means actuated by the nose of a rivet setting tool to automatically insert the mandrel stem into the nose of a rivet setting tool.

It is a further object of this invention to provide a rivet presentation device wherein bulk quantities of rivets placed in a container are fed into a rotary drum having vanes which raise the rivets onto an inclined chute. The rivets pass individually down the chute through a guide ramp which orients the rivet for positioning in a feed barrel. An open end of the feed barrel receives the nose of the rivet setting tool which actuates a switch to energize a drive means in the feed barrel which pushes the rivet out of the feed barrel and positions the mandrel stem of the rivet into the nose of the setting tool. The chute has spaced inwardly inclined ramp surfaces which permit the mandrel stem to be vertically disposed downward so that the mandrel stem end of the rivet falls down the guide ramp into the feed barrel first regardless of the orientation of the rivet when received on the inclined chute from the rotary drum.

An escapement mechanism is located at the end of the chute to permit only one fastener to fall down the ramp at a time. The escapement mechanism is triggered by the insertion and removal of the nose of the setting tool into feed barrel to permit one fastener to fall down the guide ramp at a time.

This basic approach to orienting a fastener for loading into a tool will apply to any headed fastener where the center of gravity of the fastener is opposite the head end of the fastener. Further, this invention can be used to orient and present any flanged fastener for additional handling or processing.

BRIEF DESCRIPTION OF THE DRAWINGS

FIG. 5(*a*) to (*c*) are diagrammatic illustrations of the operation of the escapement mechanism.

DESCRIPTION OF A PREFERRED EMBODIMENT

Figure 1:
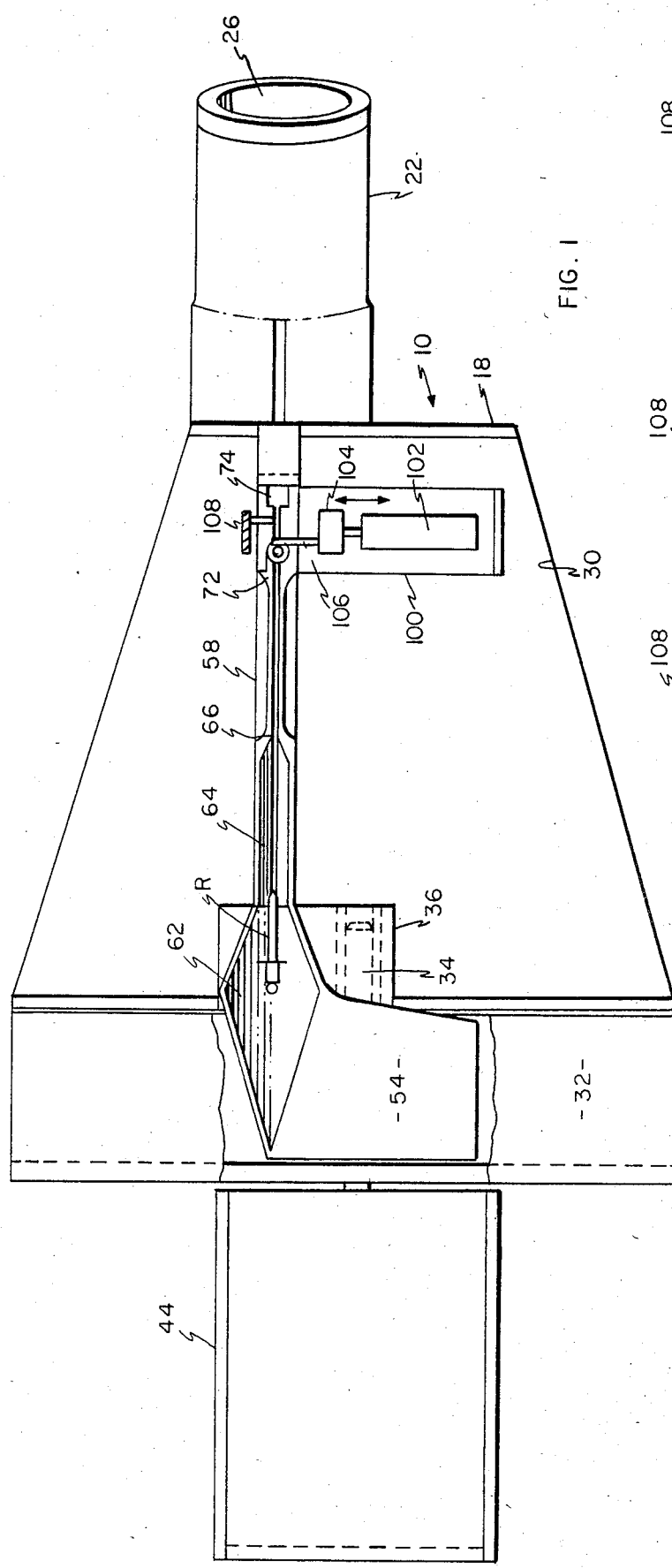
FIG. 1 is a top plan view of the rivet presentation device of the invention.

The illustrative embodiment of this invention is shown as handling blind rivets to place the rivet in the desired position for use by the setting tool. It should be understood, however, that this invention could be used with any flanged fastener to arrange the fastener for presentation to the fastener application tool or machine or for transport to such tool or machine. Additionally, it will become apparent that this device can be used to orient fasteners for additional handling or processing, such as loading the fasteners in carriers.

Attention is directed to the drawings which illustrate the rivet presentation device 10 as having a T-shaped base 12 adapted to be mounted to a worksurface by the suction cups 14. Mounted on the leg 16 of base 12 is the drum 32 and mounted on leg 20 of the base 12, is the bulk supply 18, inclined supply chute 21 and feed barrel 22. The nose 24 (see FIG. 3) of a rivet setting tool is adapted to be placed in the opening 26 of the feed barrel 22 to automatically receive the mandrel stem of the rivet, as will become apparent hereinafter.

The bulk supply 18 comprises a truncated cone-shaped container or housing 28 having sloped sides 30 which gravity feed rivets to a vertically disposed drum 32. The container has a lid 27 pivoted to the body of the container for access into the container to load the rivets. The container could have other configurations so long as the rivets are held in bulk and are fed into drum 32. The drum 32 is mounted on shaft 34 secured in bearing 36 on the vertical support 38 extending upwardly from leg 20 of base 12. The opposite end 40 (see FIG. 3) of shaft 34 is supported in a bearing 42 in housing 44 which contains a motor 46 for driving shaft 34 to rotate drum 32. (The drum could be powered by a pneumatic mechanism).

Figure 4:
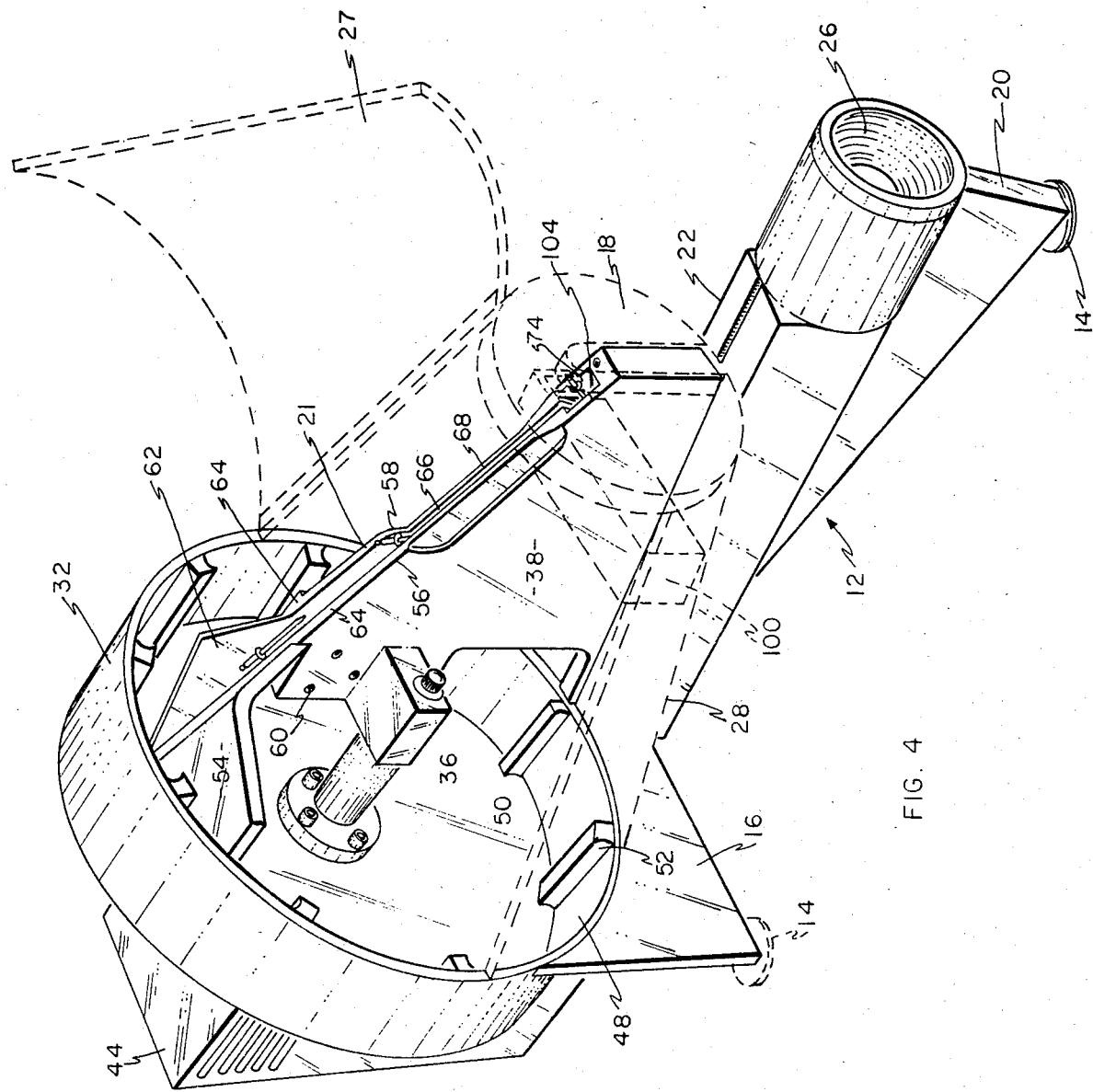
FIG. 4 is a perspective view.

The internal cylindrical surface 48 of drum 32 contains axially extending vanes 50 adapted to pickup the rivets fed from the container 28. The vanes have dish-shaped faces 52 to retain the rivet as the drum rotates the vanes 50 upwardly (clockwise - FIG. 4) to deposit the rivet on the platform 54 of the chute 21. At this point, any excess rivets on the platform 54 will fall back into the container 28 to be recirculated.

The vertical support 38 of chute 21 and feed barrel 22 are formed from separate housings 56, 58 which are secured together at various locations by fasteners 60. Adjacent the platform 54 of chute 21 on housing 58 is an inclined ramp or vane 62, which feeds the rivets down inwardly inclined surfaces 64 of housings 56, 58. The surfaces 64 are spaced to form a slot 66 through which the mandrel stems pass (see FIG. 4).

Since the center of gravity of a blind fastener is opposite the flanged rivet, the mandrel stem will fall into slot 66 which vertically aligns the fasteners down the chute 21. The rivet flanges, at this point, rest on the inclined surfaces 64. The inclined surfaces 64 each merge into a straight slotted ramp 68 which gravity feeds the rivets to an escapement mechanism 100 adjacent unloading guide ramp 70. The end 72 of slotted ramp 68 contains an opening 74 above the end 76 of guide ramp 70. The rivets, at this point, will fall mandrel end first down the guide ramp 70 into the feed barrel 22 (see FIG. 3).

Figure 2:
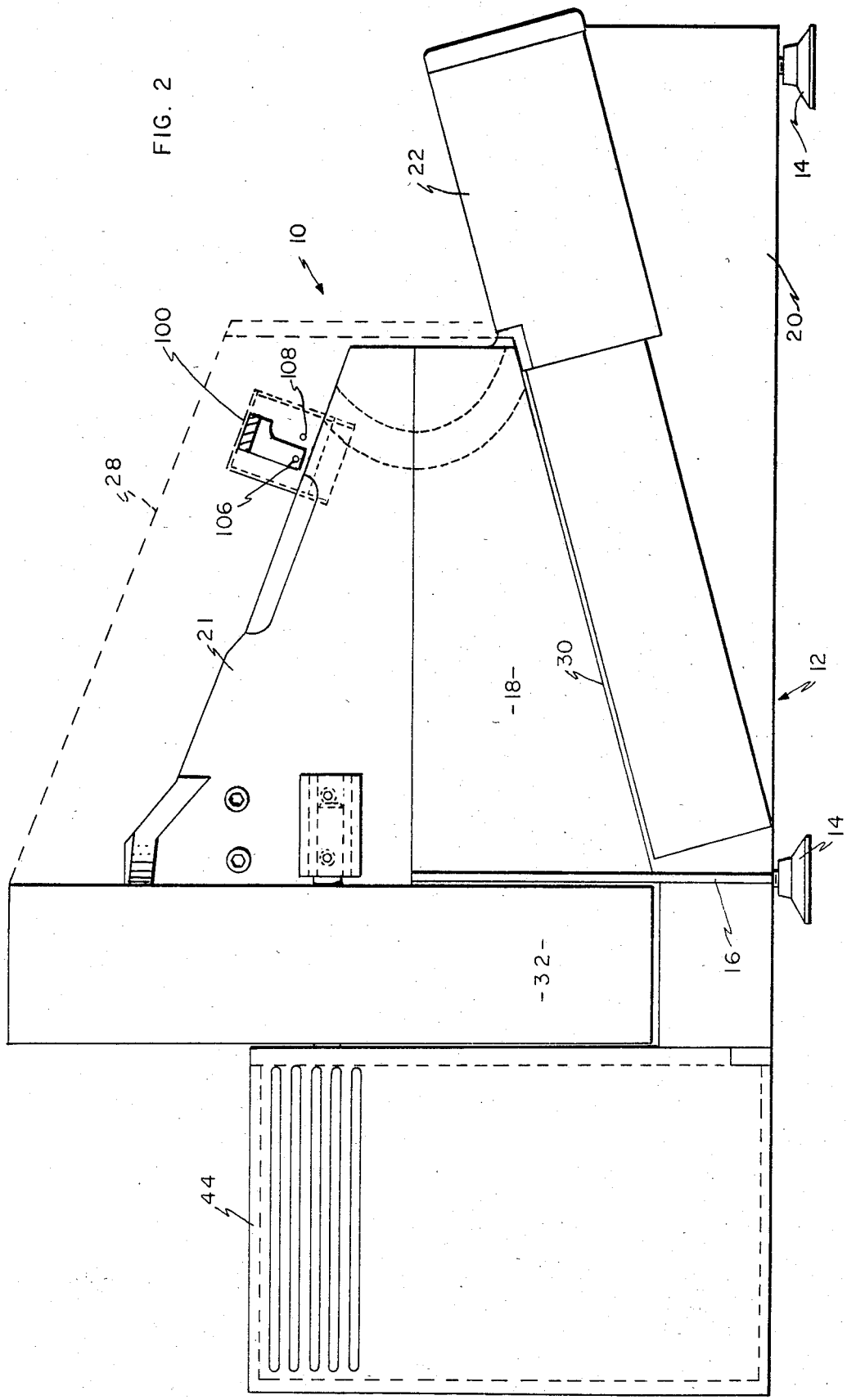
FIG. 2 is a side elevational view.
Figure 3:
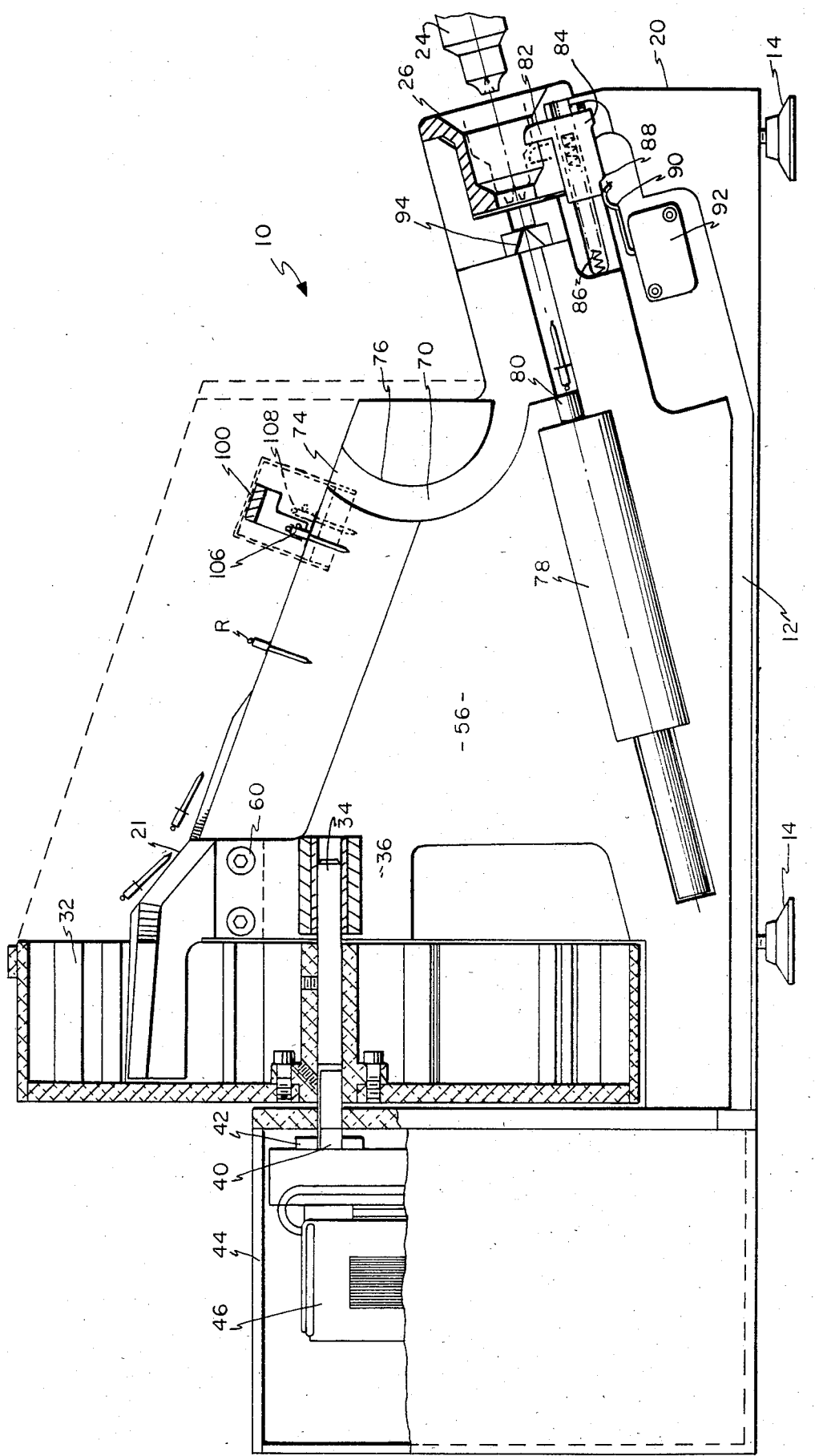
FIG. 3 is a side elevational view partially broken away.

Attention is now directed to FIGS. 2 and 3 which illustrates the details of the feed barrel 22 and the mechanism for automatically inserting the mandrel stem into the nose 24 of the setting tool.

A solenoid 78 in support 56 has a rod 80 against which the head end of the mandrel rests. The nose 24 of the setting tool is inserted into the opening 26 in feed barrel 22. Engagement of the tool nose with arm 82 on slide actuator 84 will move the actuator 84 inwardly against the bias of spring 86 (see FIG. 3). The ramp 88 on actuator 84 will force arm 90 on switch 92 down to engage the switch to energize the solenoid. The nose 24 is now fully inserted in the opening 26 (see FIG. 3) and the solenoid rod 80 will move outward forcing the mandrel stem through cone-shaped opening 94 and into the nose 24 of the setting tool. Removal of the nose 24 of the tool from opening 26 will extract the rivet. Thereafter, the spring 86 will return actuator 84 to the position illustrated in FIG. 3 and the solenoid rod 80 will be withdrawn and another rivet will be positioned down guide ramp 70 so that the entire sequence of automatic loading of the rivet into the rivet setting tool is repeated. (It should be noted that pneumatic power means could be utilized instead of solenoid 78 to power the rivet into the setting tool.)

Attention is now directed to FIG. 1 and FIGS. 5(a), (b) and (c) which illustrate the escapement mechanism 100 which permits loading a single rivet at a time into the feed barrel 22. Attached to the housing 56 is a solenoid 102 having the bracket 104 carrying opposed spaced pins 106, 108. In the inoperative condition, the rivets will be aligned in the slot 66 and abut the pin 104 (FIG. 5a). As the nose of the setting tool triggers actuator 84, the solenoid 102 is withdrawn permitting a single rivet to pass pin 106 and rests against pin 108 (FIG. 5b). (The escapement mechanism could also be powered by a pneumatic mechanism). When the nose 24 of setting tool is withdrawn from the feed barrel 22, the actuator 84 returns and the solenoid 102 is extended permitting the rivet to pass pin 108 and fall down guide ramp 70 (FIG. 5c). In this fashion, the feed barrel is loaded with a rivet and the next rivet in sequence is retained on the chute 21 against pin 106 until the preceding rivet is removed from the feed barrel 22.

From the foregoing description, it can be seen that the fasteners are obtained from a bulk source, transported by the drum to the chute which feeds the rivet to the escapement mechanism. The escapement mechanism is activated by the setting tool nose to feed a single rivet at a time down the guide ramp into the feed barrel. The nose of the setting tool also triggers the power means which automatically inserts the mandrel stem into the nose of the setting tool.

From the above description, it should be apparent that the fastener presentation device can be used to properly position the fastener into a container such as the feed barrel 22 for further processing of the fastener. The device of this invention could accomplish this result with any headed fastener where the center of gravity of the fastener is opposite the head end so that the fastener stem end would fall into proper position in the slot 66 of chute 22 and down ram 70 for further processing.

Also, from the above description, it should be apparent the drive for the drum, fastener insertion means and the escapement mechanism could be powered by a pneumatic or similar mechanical means as well as the control such as the switch 92 could be pneumatic or mechanical.

I claim:

1. A device for automatically positioning a fastener in a predetermined, desired disposition and automatically inserting the fastener into an application tool comprising:
   a. support means;
   b. a housing mounted on said support means for receiving a bulk quantity of fasteners;
   c. a vertically disposed rotary drum adapted to receive fasteners from said housing and having means to transport the fasteners upwardly during rotation of said drum;
   d. platform means carried on said support means and adapted to receive fasteners from said transport means;
   e. chute means coacting with said platform means and adapted to transport the fastener;
   f. a ramp means for receiving the fastener from said chute means and placing the fastener in a predetermined, desired disposition in a feed barrel; and
   g. drive means coacting with said feed barrel to automatically insert the fastener into the application tool.

2. The device of claim 1 wherein said housing is an enclosed container having sides inclined toward said drum to feed the fasteners into the drum.

3. The device of claim 1 wherein said drum transport means comprises axially extending vanes to pick up the fasteners and deposit the fasteners on said platform.

4. The device of claim 1 wherein said chute means comprises spaced inclined ramps adapted to support the fastener in a vertical position.

5. The device of claim 1 wherein escapement means is positioned between said chute means and said ramp means which 6. The device of claim 1 including switch means adapted to be actuated by a fastener application tool to cause said drive means to insert the fastener into the tool.

7. The device of claim 6 wherein said escapement means is activated at the time of activating said drive means.

8. The device of claim 7 wherein the tool actuates said escapement means to cause only a single fastener to pass down said ramp.

9. A device for orienting a headed fastener obtained from a bulk supply to position the fastener head and stem ends in desired positions for further processing, comprising:
  a. a vertically disposed rotary drum for transporting fasteners upwardly during rotation;
  b. an inclined chute for receiving the fasteners from said drum and positioning said fasteners in a predetermined disposition;
  c. ramp means disposed along said chute for receiving a fastener in the predetermined disposition and orienting the fastener for further processing; and
  d. escapement means positioned between said chute and said ramp means permitting only a single fastener at a time to be received into said ramp means.

10. The device of claim 1 wherein said chute includes spaced inclined ramps adapted to hold the head end of the fastener with the fastener stem end received in the space.

11. The device of claim 9 including means for further processing the fastener which activates said escapement mechanism.

12. The device of claim 11 wherein said further processing means includes a fastener application tool.

13. The device of claim 9 including a feed barrel receiving the fastener from said ramp means and adapted to present the fastener for further processing.

* * * * *

UNITED STATES PATENT AND TRADEMARK OFFICE
CERTIFICATE OF CORRECTION

PATENT NO. : 4,592,136
DATED : June 3, 1986
INVENTOR(S) : Richard F. Hirsch

It is certified that error appears in the above-identified patent and that said Letters Patent is hereby corrected as shown below:

Col. 5, line 13, after "which" insert --permits only a single fastener at one time to pass down said chute means.--

Signed and Sealed this

Twenty-fifth Day of October, 1988

Attest:

DONALD J. QUIGG

*Attesting Officer*  *Commissioner of Patents and Trademarks*